US008415001B2

(12) United States Patent
Yamashita et al.

(10) Patent No.: US 8,415,001 B2
(45) Date of Patent: Apr. 9, 2013

(54) DECORATIVE MEMBER

(75) Inventors: Shuji Yamashita, Nara (JP); Suguru Nakao, Hyogo (JP); Takehiko Yamashita, Hyogo (JP); Takashi Nagashima, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/056,093

(22) PCT Filed: Dec. 25, 2009

(86) PCT No.: PCT/JP2009/007288
§ 371 (c)(1), (2), (4) Date: Jan. 26, 2011

(87) PCT Pub. No.: WO2011/077498
PCT Pub. Date: Jun. 30, 2011

(65) Prior Publication Data

US 2011/0281075 A1 Nov. 17, 2011

(51) Int. Cl.
*G02B 1/08* (2006.01)
*G02B 1/04* (2006.01)
*A47B 95/04* (2006.01)

(52) U.S. Cl.
USPC ................. 428/161; 428/13; 428/14; 428/29; 428/162; 428/163; 428/164; 428/172; 428/542.2; 428/913.3

(58) Field of Classification Search .................... 428/13, 428/14, 29, 161, 162, 164, 172, 542.2, 913.3, 428/163; 348/836, 837, 838, 839, 840, 841, 348/842; 312/7.2, 223.1; 361/600
See application file for complete search history.

(56) References Cited

U.S. PATENT DOCUMENTS

| | | | | |
|---|---|---|---|---|
| 3,590,509 | A * | 7/1971 | Fukumitsu | 40/616 |
| 6,150,007 | A | 11/2000 | Oshima et al. | |
| 2007/0026197 | A1 * | 2/2007 | Suga et al. | 428/172 |

FOREIGN PATENT DOCUMENTS

| | | |
|---|---|---|
| JP | 57-100068 | 6/1982 |
| JP | 58-007494 | 2/1983 |
| JP | 1-242219 | 9/1989 |
| JP | 2-102010 | 4/1990 |
| JP | 4-47607 | 8/1992 |
| JP | 5-000645 | 1/1993 |
| JP | 6-99698 | 4/1994 |
| JP | 7-195462 | 8/1995 |
| JP | 2000-153566 | 6/2000 |
| JP | 2001-225349 | 8/2001 |
| JP | 2004-237614 | 8/2004 |
| JP | 2004-301688 | 10/2004 |
| JP | 2005-193634 | 7/2005 |
| JP | 2008-100367 | 5/2008 |

(Continued)

*Primary Examiner* — Maria Veronica Ewald
*Assistant Examiner* — Joanna Pleszczynska
(74) *Attorney, Agent, or Firm* — Hamre, Schumann, Mueller & Larson, P.C.

(57) ABSTRACT

A decorative member composing a casing includes: a resin layer (2) having a front surface (2*b*) and a back surface (2*a*); and a reflective layer (3) formed on the back surface (2*a*) of the resin layer (2). The back surface (2*a*) of the resin layer (2) includes a receding surface (21) formed therein. The receding surface recedes gradually toward the front surface (2*b*) to change a thickness of the resin layer (2). The receding surface (21) is a concave surface forming a depression that opens while broadening. The back surface (2*a*) of the resin layer (2) has a reference surface (22) around the receding surface (21), and a portion of the reference surface (22) facing an internal space of the casing is a roughened area (4).

10 Claims, 6 Drawing Sheets

FOREIGN PATENT DOCUMENTS

| | | |
|---|---|---|
| JP | 2008-105435 | 5/2008 |
| JP | 2008-213331 | 9/2008 |
| JP | 2008-284713 | 11/2008 |
| JP | 2009-269181 | 11/2009 |
| JP | 2009-269222 | 11/2009 |
| JP | 2011-005687 | 1/2011 |

* cited by examiner

DECORATIVE MEMBER

TECHNICAL FIELD

The technique disclosed herein relates to a decorative member that exhibits a pattern having a raised three-dimensional appearance.

BACKGROUND ART

Conventionally, as a decorative member for realizing a design with a three-dimensional visual effect, Patent Literature 1 has disclosed a decorative member 100 as shown in FIG. 6. In the decorative member 100, a transparent or translucent resin plate 200 has a back surface serrated with steep slopes 210 with a large inclination angle and gentle slopes 220 with a small inclination angle repeated alternately, and the back surface is covered with a colored layer 300.

The colored layer 300 has light reflecting capability. At portions of the colored layer 300 facing the gentle slopes 220, light that has entered the resin plate 200 through its front surface is reflected by the colored layer 300 so as to return to a front side. However, at portions of the colored layer 300 facing the steep slopes 210, the light is reflected by the colored layer 300 so as to veer in a lateral direction.

This allows the colored layer 300 to look dark at portions corresponding to the steep slopes 210, forming a three-dimensional stripe pattern appearance.

CITATION LIST

Patent Literature

PTL 1JP 58 (1983)-7494 B

SUMMARY OF INVENTION

Technical Problem

In Patent Literature 1, as is apparent from the fact that the term "colored layer" is used therein, the colored layer 300 represents the color of the pattern of the decorative member 100. However, in such a case where the colored layer 300 represents the color of the pattern of the decorative member 100, the ridges formed by providing the colored layer 300 along the two slopes 210, 220 do not look raised well, and the three-dimensional visual effect is not so high.

In view of the foregoing, the technique disclosed herein is intended to provide a decorative member with a high three-dimensional visual effect.

Solution to Problem

The above-mentioned problems is solved by a decorative member composing a casing, including: a colored light-transmissive resin layer having a front surface and a back surface, the back surface including a receding surface formed therein, the receding surface receding gradually toward the front surface to change a thickness that is a distance between the front surface and the back surface; and a reflective layer formed on the back surface of the resin layer so as to cover the receding surface. The receding surface is a concave surface forming a depression that opens while broadening. The back surface of the resin layer has a reference surface around the receding surface. A portion of the reference surface facing an internal space of the casing is a roughened area.

Advantageous Effects of Invention

In the above-mentioned decorative member, by changing, with the receding surface, the thickness of the colored resin layer, it is possible to form, on a convex portion formed by providing the reflective layer along the receding surface, a gradation of color that is pale at a thin portion of the resin layer and deep at a thick portion of the resin layer. Moreover, because of the transmission loss of light in the resin layer and the reflection of light by the reflective layer, the convex portion of the reflective layer along the receding surface looks bright at the thin portion of the resin layer and dark at the thick portion of the resin layer. With such a gradation having not only the lightness/depth of color but also the contrast of light utilizing the reflection of light, the convex portion of the reflective layer has a distinctly raised appearance. Thereby, a high three-dimensional visual effect can be obtained.

Such a decorative member might be used as a member composing a part of a casing of an electrical device, for example. In this case, from the viewpoint of workability in attaching the decorative member, it is preferable to configure the decorative member so that the receding surface is a concave surface forming a depression that opens while broadening, and the back surface of the resin layer has a reference surface around the receding surface. In such an application, high grade feeling is lost when the inside of the casing is visible through the casing. Thus, it is conceivable to cover also the reference surface of the resin layer with the reflective layer, but this increases the manufacturing cost. In contrast, in the above-mentioned decorative member, since the portion of the reference surface facing the internal space of the casing is a roughened area, it is hard to see the inside of the casing. Therefore, the technique disclosed herein makes it possible to maintain the high design efficiency of the casing by employing an inexpensive configuration of a roughened area.

DESCRIPTION OF EMBODIMENTS

Hereinafter, embodiments of the present invention will be described with reference to the drawings.

Figure 1:
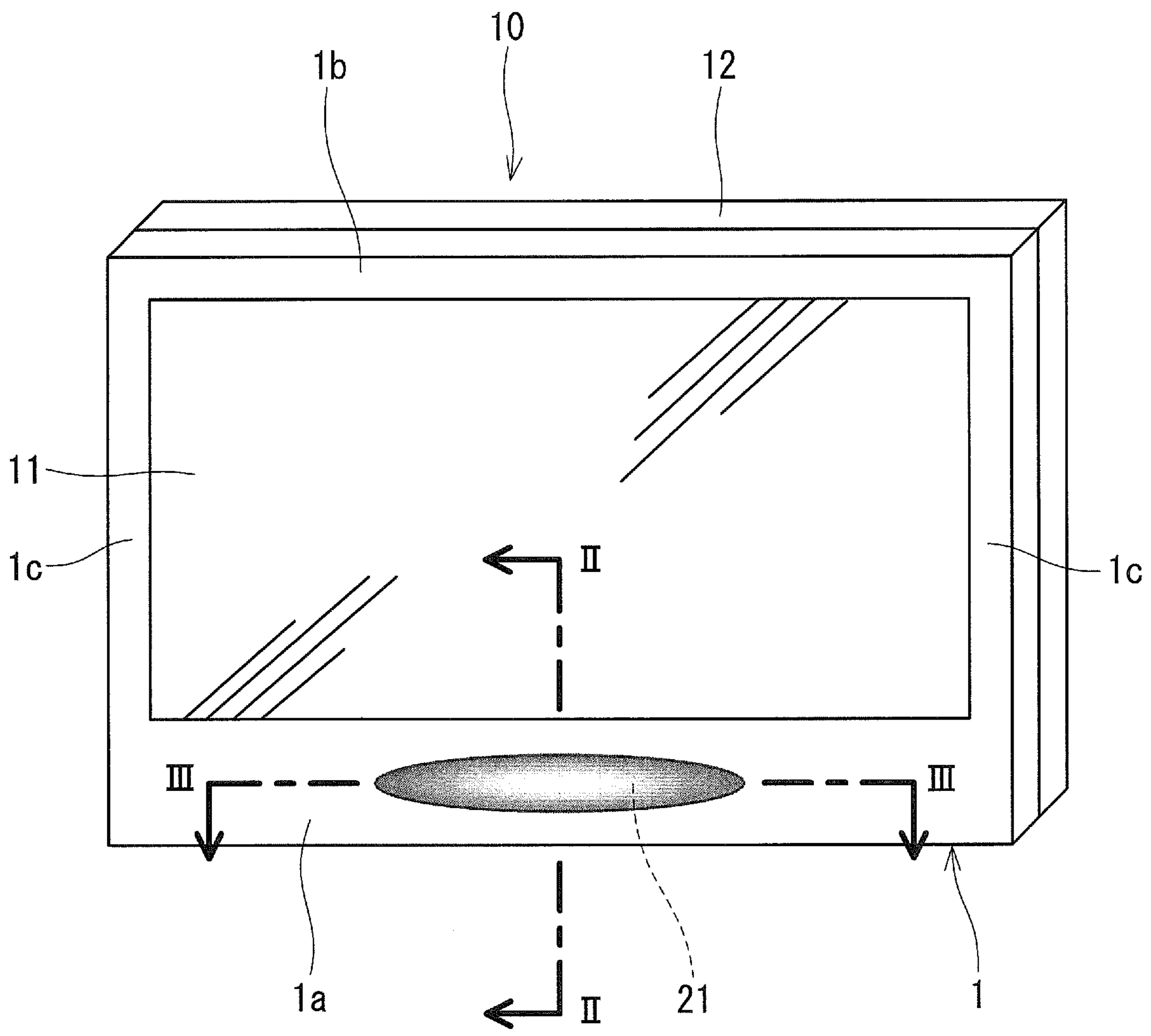
FIG. 1 is a perspective view of a television set having a casing with a decorative member according to one embodiment of the present invention.

FIG. 1 shows a television set having a casing 10 with a decorative member 1 according to one embodiment of the present invention. The television set is provided with a panel-like image display device 11 accommodated in the casing 10. The casing 10 is composed of the decorative member 1 functioning as a front cover covering a peripheral portion of the image display device 11 from a front side; and a back cover 12 that covers the image display device 11 from a back side and is joined to an outer peripheral portion of the decorative member 1.

The decorative member 1 is composed mainly of a resin layer 2 (see FIG. 2 and FIG. 3), and is formed in a rectangular frame shape that opens in a thickness direction of the resin layer 2. More specifically, the decorative member 1 has an upper side portion 1*b*, a lower side portion 1*a*, and a pair of lateral side portions 1*c*.

The resin layer 2 is colored and light-transmissive. More specifically, the resin layer 2 allows light in a specified wavelength range of a visible light range to transmit there through, and absorbs or reflects light other than this. The color of the resin layer 2 is not particularly limited. Preferably, a relatively deep color (for example: black, red, and blue; or ACRYLITE produced by Mitsubishi Rayon Co., Ltd., color tone No. 530 (blue smoke), No. 540 (green smoke), No. 550 (brown smoke), and No. 83 (gray smoke)) is used. As the material composing the resin layer 2, various polymers, such as an acrylic resin, polycarbonate, ABS (acrylonitrile butadiene styrene), polyamide, and nylon, can be used independently or in combination as a polymer alloy.

Figure 2:
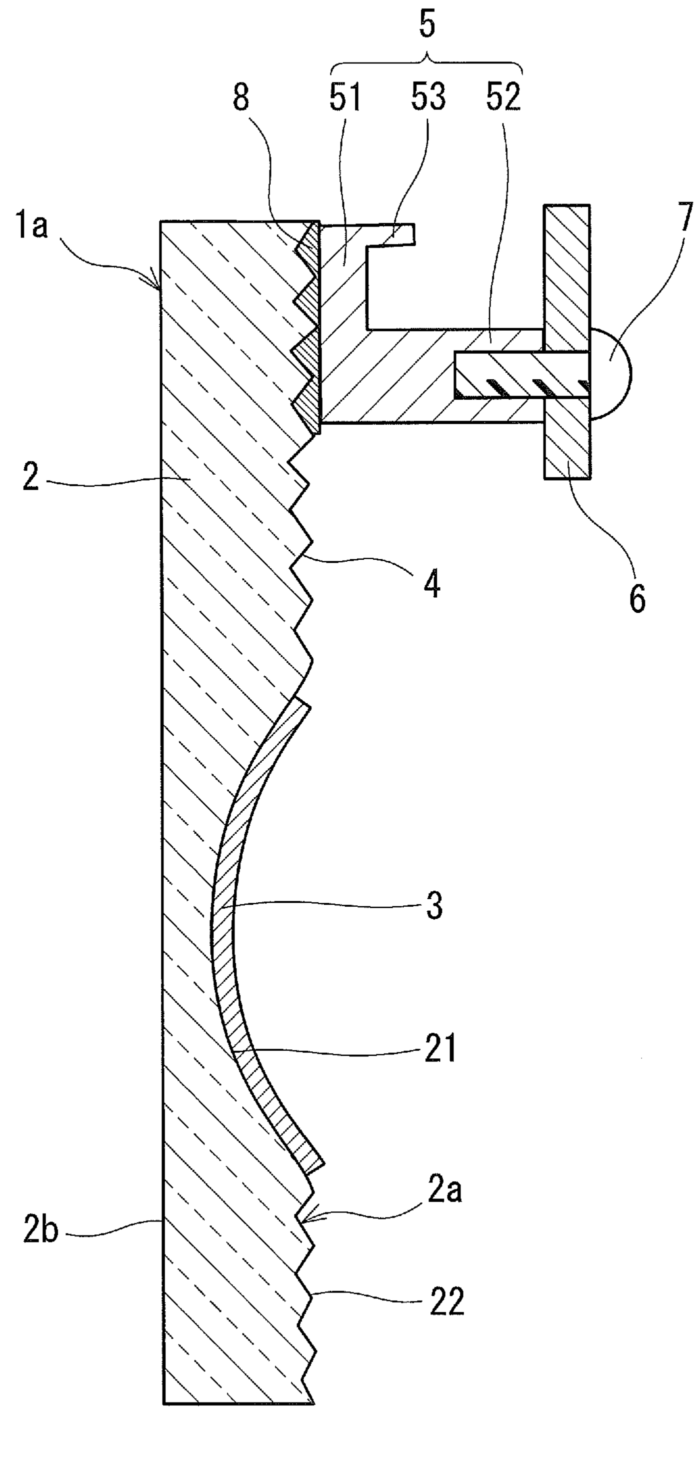
FIG. 2 is a cross-sectional view of FIG. 1 taken along the line II-II.
Figure 3:
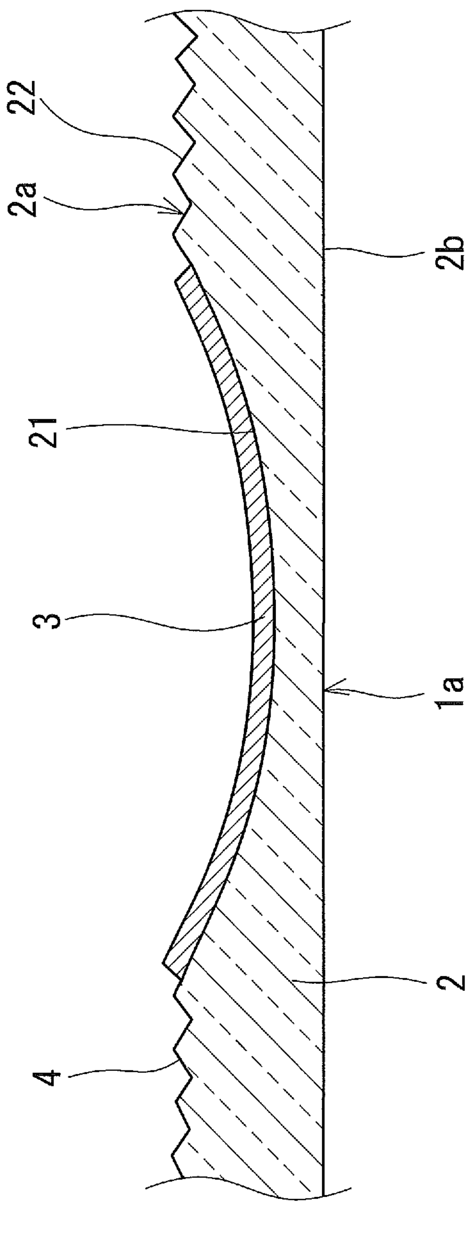
FIG. 3 is a cross-sectional view of FIG. 1 taken along the line III-III.

Specifically, as shown in FIG. 2 and FIG. 3, the resin layer 2 has a front surface 2*b* that is one surface in the thickness direction thereof, and a back surface 2*a* that is the other surface in the thickness direction. The front surface 2*b* is a flat surface perpendicular to the thickness direction of the resin layer 2. At the lower side portion 1*a* of the decorative member 1, a receding surface 21 is formed in the back surface 2*a* of the resin layer 2. The receding surface 21 recedes gradually toward the front surface 2*b* to change a thickness that is a distance between the front surface 2*b* and the back surface 2*a*. The receding surface 21 is a concave surface forming a depression that opens while broadening. The back surface 2*a* includes, around the receding surface 21, a reference surface 22 that is parallel to the front surface 2*b* (in other words, the reference surface 22 is perpendicular to the thickness direction of the resin layer 2.)

The receding surface 21 is curved continuously along at least one direction perpendicular to the thickness direction of the resin layer 2 so as to be convex toward the front surface 2*b*. As stated herein, the phrase "to be curved continuously" means that the gradient of a tangent of a cross-sectional shape of the receding surface 21 in a direction in which the receding surface 21 is curved varies in one-way direction from one end to the other end of the cross-sectional shape substantially continuously. In the present embodiment, the receding surface 21 is a concave surface having a dome shape curved continuously along a longer direction and a shorter direction of the lower side portion 1*a* (two directions perpendicular to each other and to the thickness direction of the resin layer 2). It should be noted that the receding surface 21 may be formed in a linear curving manner with a constant curvature, or in a non-linear curving manner with a variable curvature. The term "substantially" indicates a concept including a case where: concave and convex portions such as those remaining on the surface during processing are ignored; and the gradient of a tangent of a cross-sectional shape of the receding surface 21 varies in one-way direction from one end to the other end of the cross-sectional shape continuously in a shape recognizable by human vision.

The shape of the receding surface 21 in a plan view is not particularly limited. Preferably, the receding surface 21 extends in the longer direction of the lower side portion 1*a*. For example, the shape of the receding surface 21 may be an elliptical shape or a strip-like shape with both ends being roundish, when viewed from the thickness direction of the resin layer 2.

A peripheral portion of the receding surface 21 may be joined directly to the reference surface 22 angularly so as to form a ridgeline with the reference surface 22. Alternatively, there may be provided a joint, having a cross-sectional shape that is convex in the direction opposite to that of the receding surface 21, annularly between the peripheral portion of the receding surface 21 and the reference surface 22, and the peripheral portion of the receding surface 21 may be joined smoothly to the reference surface 22 via the joint.

The resin layer 2 as mentioned above can be molded by a molding method such as injection molding, heating compression molding, and a combination of extrusion molding and heating compression molding. In molding the resin layer 2, it is preferable to use a mirror-finished metal mold in order to prevent the irregular reflection of light by the front surface 2*b* and to enhance the texture.

A reflective layer 3 is formed on the back surface 2*a* of the resin layer 2 so as to cover the receding surface 21. The reflective layer 3 serves to reflect the light that has transmitted through the resin layer 2. Preferably, the reflective layer 3 essentially blocks light in the visible light range (approximately 400 to 750 nm) from transmitting there through, and has high reflectance to light essentially throughout the visible light range. From the viewpoint of regularly reflecting the light that has transmitted through the resin layer 2, a front surface of the reflective layer 3 contacting the receding surface 21 of the resin layer 2 preferably is a lustrous smooth surface. For example, the transmittance of the reflective layer 3 to visible light preferably is 5% or less, more preferably 1% or less, and particularly preferably 0.1% or less. The reflectance and the smooth surface are expressed in terms of a gloss (luster) value of the front surface of the reflective layer 3. When the gloss value in the case where the brightness difference between incident light and receiving light is 10%, with the incident angle being 60 degree and the receiving angle being −60 degree on a glass surface (with a refractive index of 1.567), is taken as 100, the gloss value of the front surface of the reflective layer 3 preferably is 200 or more, more preferably 700 or more, and particularly preferably about 800.

Furthermore, the reflective layer 3 preferably has a metallic color. The reflective layer 3 can be composed of, for example: a coating film formed by coating a coating material containing a metallic pigment or a metallic colorant, or by printing a metallic ink; a metal film formed by vapor-depositing metal such as aluminum; or a metallic-colored sheet bonded to the receding surface 21 of the resin layer 2. Or the reflective layer 3 may be composed of a press-molded metal plate stuck directly on the receding surface 21, for example.

Alternatively, the reflective layer 3 may be formed by coating or printing, on the receding surface 21, a coating material or ink containing powder with a high light reflectance. As the powder with a high light reflectance, there can be used metal powder such as aluminum powder, glass particles, a pigment such as a pearl pigment, and other lustrous powder materials, for example.

Furthermore, in the present embodiment, a portion of the reference surface 22 facing an internal space of the casing 10 is a roughened area 4 outside the reflective layer 3. The roughened area 4 can be formed by providing the reference surface 22 with fine concaves and convexes. Preferably, the roughened area 4 has an arithmetic average roughness (Ra according to JIS B 0601) of 1 to 200 μm, and more preferably 5 to 30 μm.

As the method for forming the roughened area 4, a molding technique may be used. In the case of using a molding technique, it is preferable to process a surface of a mold in advance to have a satin-like texture by etching, and transfer this satin-like texture to the reference surface 22 of the resin layer 2 at the time of molding. This makes it possible to form the roughened area 4 easily at low cost. Alternatively, it is possible to form the roughened area 4 by, after the flat reference surface 22 is formed, roughening the reference surface 22 directly by shot blasting or by using a sandpaper. In the case of forming the roughened area 4 by using the molding technique or by roughening the reference surface 22 directly, the fine concaves and convexes making the roughened area 4 irregularly reflect and diffuse the incident light from the front surface 2*b* of the resin layer 2. Thereby, it becomes hard to see the inside of the casing 10.

Alternatively, it also is possible to form the roughened area 4 by subjecting the reference surface 22 to a knurl process in which grooves depressed in a V shape with 45 degree inclination are formed in a pattern of parallel lines or grid. In the case of forming the roughened area 4 by the knurl process, the incident light from the front surface 2*b* of the resin layer 2 is dispersed by the lens effect of the fine concaves and convexes making the roughened area 4. Thereby, it becomes hard to see the inside of the casing 10.

A structure body (a bracket, for example) 5 for fixing a component to be disposed in the casing 10 is attached onto the roughened area 4. For example, a circuit board 6 is fixed to the structure body 5 with a screw 7.

The structure body 5 is bonded to the roughened area 4 with an adhesive 8. Specifically, the structure body 5 has: a main part 51 that is a portion to be bonded to the roughened area 4; a boss 52 with a tapped hole into which the screw 7 is to be screwed, provided on the main part 51 in a protruding manner; and a rib 53 for reinforcing the main part 51. The structure body 5 may be bonded to the roughened area 4 with a double-sided tape instead of the adhesive 8.

In the decorative member 1 of the present embodiment described above, by changing, with the receding surface 21, the thickness of the colored resin layer 2, it is possible to form, on a convex portion formed by providing the reflective layer 3 along the receding surface 21, a gradation of color that is pale at a thin portion of the resin layer 2 and deep at a thick portion of the resin layer 2 as shown in FIG. 1. Moreover, because of the transmission loss of light in the resin layer 2 and the reflection of light by the reflective layer 3, the convex portion of the reflective layer 3 along the receding surface 21 looks bright at the thin portion of the resin layer 2 and dark at the thick portion of the resin layer 2. With such a gradation having not only the lightness/depth of color but also the contrast of light utilizing the reflection of light, the convex portion of the reflective layer 3 has a distinctly raised appearance. Thereby, a high three-dimensional visual effect can be obtained.

Furthermore, in the present embodiment, since the portion of the reference surface 22 facing the internal space of the casing 10 is the roughened area 4, it is hard to see the inside of the casing 10. This makes it possible to hide components inside the casing 10, such as the circuit board 6 and wires, that spoil the good appearance. Therefore, with the decorative member 1 of the present embodiment, it is possible to maintain the high design efficiency of the casing 10 by employing an inexpensive configuration of the roughened area 4.

Furthermore, in the decorative member 1 of the present embodiment, since the receding surface 21 is curved continuously, it is possible to change gradually and minutely the lightness/depth of color and the contrast of light in the gradation from the thin portion of the resin layer to the thick portion of the resin layer. Moreover, the degree of the gradation formed on the convex portion of the reflective layer 3 varies in accordance with the angle at which the decorative member 1 is viewed. Thereby, the three-dimensional visual effect can be accentuated further.

(Other Embodiments)

The decorative member according to the present invention is not limited to the above-mentioned embodiments and variously can be modified and changed without departing the technical scope thereof.

Figure 4A:
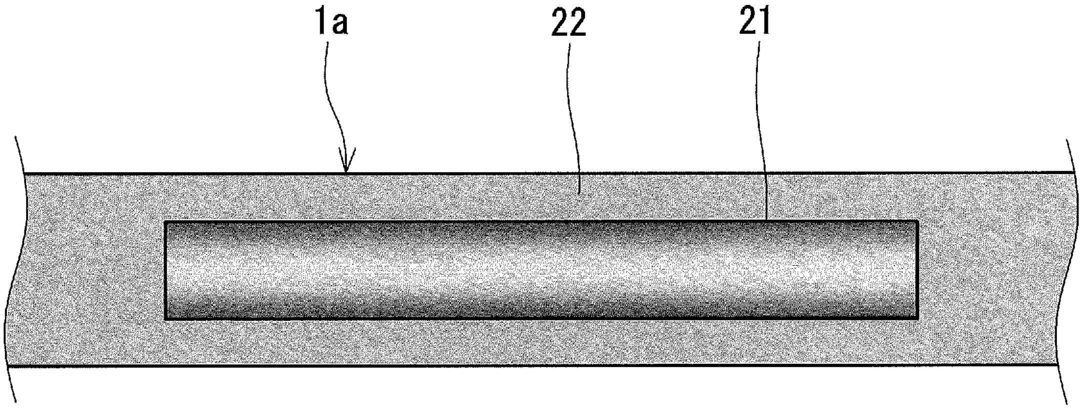
FIG. 4A is a view showing an appearance of a lower side portion of a modified decorative member when viewed from a front side thereof.
Figure 4B:
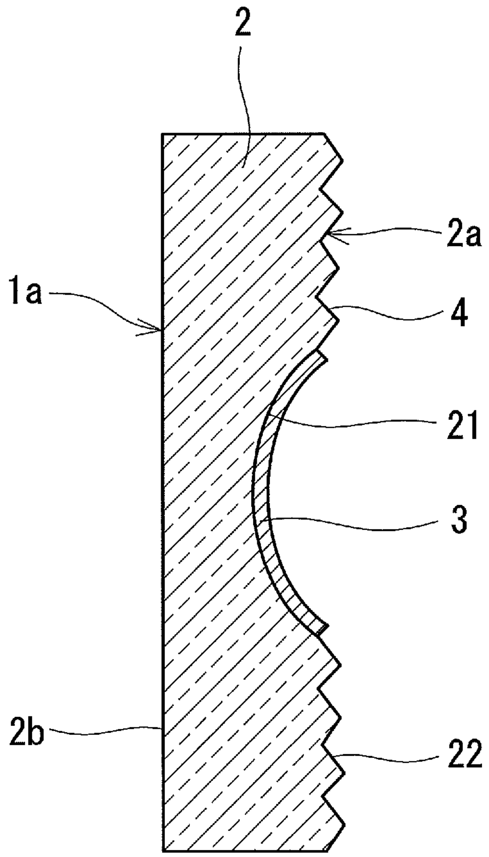
FIG. 4B is a cross-sectional view of the lower side portion of the decorative member.

For example, as shown in FIGS. 4A and 4B, the receding surface 21 may be a concave surface having a cylindrical shape curved continuously along only the shorter direction of the lower side portion 1*a* (one direction perpendicular to the thickness direction of the resin layer.) Even in this case, there is formed a gradation with a three-dimensional visual effect as shown in FIG. 4A, in which the lightness/depth of color and the contrast of light change gradually and minutely from the thin portion of the resin layer to the thick portion of the resin layer.

Figure 5:
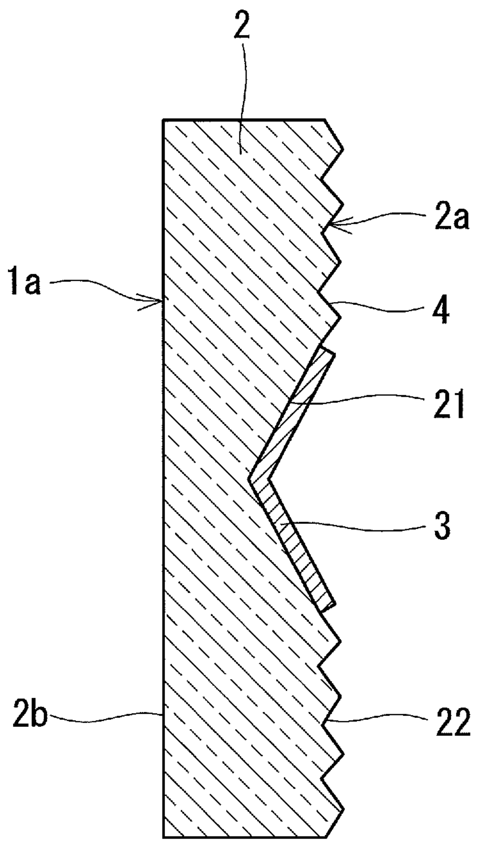
FIG. 5 is a cross-sectional view of a lower side portion of another modified decorative member.
Figure 6:
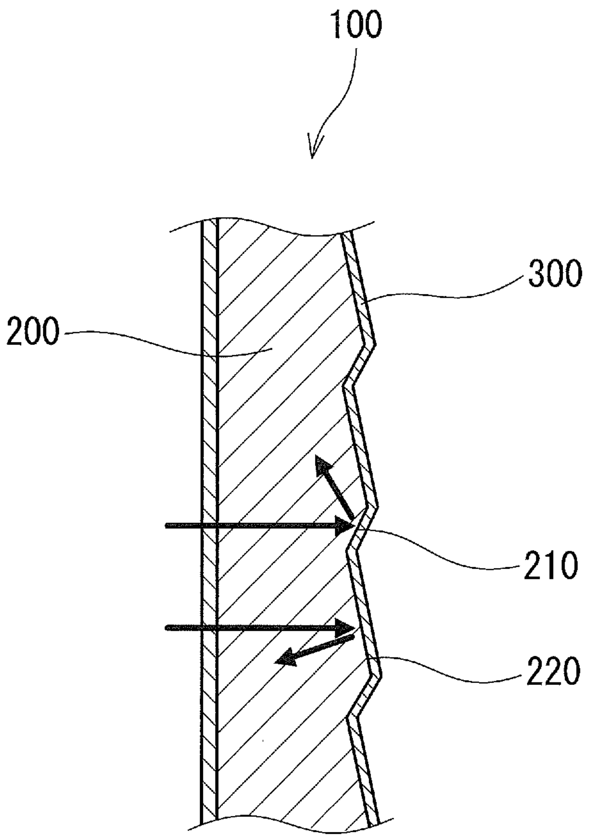
FIG. 6 is a cross-sectional view of a conventional decorative member.

Furthermore, the receding surface 21 does not necessarily have to be curved along at least one direction perpendicular to the thickness direction of the resin layer 2 so as to be convex toward the front surface 2*b*. For example, as shown in FIG. 5, the receding surface 21 may be inclined linearly toward the front surface 2*b* to form a V-shaped groove.

The receding surface 21 does not necessarily have to be provided at the lower side portion 1*a* of the decorative member 1. It may be provided at the upper side portion 1*b* or the lateral side portions 1*c*, or may be provided at two or more of the 1*a* to 1*c*. That is, the receding surface 21 may be provided so as to extend along at least one side of the rectangular frame shape of the decorative member 1.

Although the front surface 2*b* of the resin layer 2 is a flat surface in the above-mentioned embodiments, the front surface 2*b* of the resin layer 2 may be bowed or may be formed with an undulation, for example. Moreover, the reference surface 22 of the back surface 2*a* of the resin layer 2 does not necessarily have to be perpendicular to the thickness direction of the resin layer 2. For example, in the case where the front surface 2*b* is bowed, the reference surface 22 may be bowed parallel to the front surface 2*b*.

The decorative member does not necessarily have to be formed in a rectangular frame shape. It may be formed, for example, in an approximately rectangular plate-like shape extending in a specified direction. Alternatively, the decorative member may have a regular polygonal shape or circular shape in a plan view.

Industrial Applicability

The decorative member according to the present invention is useful not only for casings of electrical devices but also for furniture, building materials, toys, etc.

The invention claimed is:

1. A decorative member composing a casing, comprising:

a colored light-transmissive resin layer having a front surface and a back surface, the back surface including a receding surface formed therein, the receding surface receding gradually toward the front surface to change a thickness that is a distance between the front surface and the back surface; and a reflective layer formed on the back surface of the resin layer so as to cover the receding surface, wherein the receding surface is a concave surface forming a depression that opens while broadening, and the back surface of the resin layer has a reference surface around the receding surface, and a portion of the reference surface facing an internal space of the casing is a roughened area, a front surface of the reflective layer contacting the receding surface of the resin layer is a lustrous smooth surface, and when a gloss value, determined when a brightness difference between incident light and receiving light is 10%, with an incident angle being 60 degrees and a receiving angle being −60 degrees on a glass surface with a refractive index of 1.567, is taken as 100, a gloss value of the front surface of the reflective layer is 200 or more.

2. The decorative member according to claim 1, wherein a structure body for fixing a component to be disposed in the casing is attached onto the roughened area.

3. The decorative member according to claim 1, wherein the concave surface is curved continuously along at least one direction perpendicular to a thickness direction of the resin layer so as to be convex toward the front surface.

4. The decorative member according to claim 3, wherein the concave surface has a cylindrical shape curved continuously along the one direction perpendicular to the thickness direction of the resin layer.

5. The decorative member according to claim 3, wherein the concave surface has a dome shape curved continuously along two directions perpendicular to each other and to the thickness direction of the resin layer.

6. The decorative member according to claim 1, wherein the reference surface is perpendicular to a thickness direction of the resin layer.

7. The decorative member according to claim 1, wherein the front surface of the resin layer is a flat surface perpendicular to a thickness direction of the resin layer.

8. The decorative member according to claim 1, wherein the reflective layer has a metallic color.

9. The decorative member according to claim 8, wherein the reflective layer is composed of a coating film formed by coating or printing, a metal film formed by vapor deposition, or a sheet bonded to the back surface of the resin layer.

10. The decorative member according to claim 1, wherein the decorative member is formed in a rectangular frame shape that opens in a thickness direction of the resin layer, and the receding surface is provided so as to extend along at least one side of the rectangular frame shape.

* * * * *

UNITED STATES PATENT AND TRADEMARK OFFICE

CERTIFICATE OF CORRECTION

PATENT NO. : 8,415,001 B2
APPLICATION NO. : 13/056093
DATED : April 9, 2013
INVENTOR(S) : Yamashita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 114 days.

Signed and Sealed this
Twelfth Day of November, 2013

Teresa Stanek Rea
*Deputy Director of the United States Patent and Trademark Office*